United States Patent
Hahn et al.

(10) Patent No.: US 12,015,477 B2
(45) Date of Patent: *Jun. 18, 2024

(54) METHOD AND APPARATUS FOR TRANSMITTING SIDELINK DATA IN COMMUNICATION SYSTEM

(71) Applicants: Hyundai Motor Company, Seoul (KR); Kia Corporation, Seoul (KR)

(72) Inventors: Gene Back Hahn, Gyeonggi-do (KR); Hyuk Min Son, Jeollabuk-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,527

(22) Filed: Dec. 7, 2022

(65) Prior Publication Data

US 2023/0099975 A1    Mar. 30, 2023

Related U.S. Application Data

(63) Continuation of application No. 16/993,443, filed on Aug. 14, 2020, now Pat. No. 11,558,141.

(30) Foreign Application Priority Data

Jul. 1, 2020   (KR) .......................... 10-2020-008111

(51) Int. Cl.
*H04W 72/04*    (2023.01)
*H04L 1/00*    (2006.01)
(Continued)

(52) U.S. Cl.
CPC .......... *H04L 1/0004* (2013.01); *H04L 1/1819* (2013.01); *H04W 4/40* (2018.02);
(Continued)

(58) Field of Classification Search
CPC ..... H04L 1/0004; H04L 1/1819; H04L 1/189; H04L 1/0003; H04L 1/0023;
(Continued)

(56) References Cited

U.S. PATENT DOCUMENTS

2017/0289733 A1*  10/2017  Rajagopal ............. H04L 5/0082
2019/0052436 A1    2/2019  Desai et al.
(Continued)

OTHER PUBLICATIONS

Extended European Search Report received for European Patent Application No. 20190796.1 dated Mar. 17, 2021, 13 pages.

*Primary Examiner* — Mahbubul Bar Chowdhury
(74) *Attorney, Agent, or Firm* — Fox Rothschild LLP

(57) ABSTRACT

An operation method of a first terminal in a communication system is provided. The method includes transmitting first SCI to a second terminal, the first SCI including one or more information elements among information indicating time resource(s) for sidelink communication, information indicating frequency resource(s) for the sidelink communication, information indicating a periodicity of physical resources for the sidelink communication, and information indicating an MCS for the sidelink communication. Second SCI is transmitted to the second terminal, the second SCI including information for an HARQ feedback operation and information indicating an NDI. The method further includes performing the sidelink communication with the second terminal based on the first SCI and the second SCI associated with the first SCI.

14 Claims, 10 Drawing Sheets

Related U.S. Application Data

(60) Provisional application No. 62/887,915, filed on Aug. 16, 2019.

(51) Int. Cl.
| | |
|---|---|
| *H04L 1/1812* | (2023.01) |
| *H04W 4/40* | (2018.01) |
| *H04W 72/02* | (2009.01) |
| *H04W 72/23* | (2023.01) |
| *H04W 72/56* | (2023.01) |
| *H04W 80/02* | (2009.01) |
| *H04W 80/08* | (2009.01) |
| *H04W 92/18* | (2009.01) |

(52) U.S. Cl.
CPC ........... *H04W 72/02* (2013.01); *H04W 72/23* (2023.01); *H04W 72/56* (2023.01); *H04W 80/02* (2013.01); *H04W 80/08* (2013.01); *H04W 92/18* (2013.01)

(58) Field of Classification Search
CPC ... H04L 1/1896; H04L 1/1864; H04L 1/1861; H04L 5/0055; H04L 5/0094; H04L 5/0007; H04L 5/0044; H04B 7/0456; H04B 7/0626; H04W 4/40; H04W 72/02; H04W 72/042; H04W 72/10; H04W 72/1289; H04W 72/21; H04W 72/56; H04W 80/02; H04W 80/08; H04W 92/18; H04W 88/04; H04W 76/14
See application file for complete search history.

(56) References Cited

U.S. PATENT DOCUMENTS

| | | | |
|---|---|---|---|
| 2020/0008183 A1* | 1/2020 | Chen | H04W 72/20 |
| 2020/0163103 A1* | 5/2020 | Kuang | H04W 72/23 |
| 2020/0236666 A1* | 7/2020 | Yu | H04L 1/1812 |
| 2020/0236730 A1* | 7/2020 | Shin | H04W 24/08 |
| 2020/0288435 A1* | 9/2020 | Kwak | H04L 1/0079 |
| 2020/0403737 A1* | 12/2020 | Yeo | H04L 1/1861 |
| 2021/0028891 A1* | 1/2021 | Zhou | H04W 4/40 |
| 2021/0204250 A1* | 7/2021 | Ashraf | H04W 4/70 |
| 2021/0385694 A1* | 12/2021 | Freda | H04W 74/0816 |
| 2022/0124562 A1* | 4/2022 | Yu | H04W 72/20 |
| 2023/0208557 A1* | 6/2023 | Yeo | H04L 1/0023 370/329 |

* cited by examiner

METHOD AND APPARATUS FOR TRANSMITTING SIDELINK DATA IN COMMUNICATION SYSTEM

CROSS-REFERENCE TO RELATED APPLICATIONS

This application claims the benefit of priorities to U.S. Provisional Patent Application No. 62/887,915, filed on Aug. 16, 2019 with the U.S. Patent and Trademark Office, and Korean Patent Application No. 10-2020-0081111, filed on Jul. 1, 2020 in the Korean Intellectual Property Office (KIPO), the entire contents of which are incorporated herein by reference.

BACKGROUND

1. Technical Field

The present disclosure relates generally to sidelink communication technology, and more specifically, to a technique for retransmission of sidelink data in a communication system.

2. Related Art

Various systems have been developed for processing of wireless data such as the fourth-generation (4G) communication system (e.g., Long Term Evolution (LTE) communication system or LTE-Advanced (LTE-A) communication system) and the fifth-generation (5G) communication system (e.g., New Radio (NR) communication system), which uses a frequency band higher than the frequency band of the 4G communication system. The 5G communication system supports Enhanced Mobile Broadband (eMBB) communications, Ultra-Reliable and Low-Latency communications (URLLC), massive Machine Type Communications (mMTC), and the like.

The 4G communication system and 5G communication system support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication system, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications may be established, and communications between the vehicles may be performed using the sidelink channels.

Meanwhile, the sidelink communication may be performed based on a unicast scheme, a groupcast scheme, and/or a broadcast scheme. Additionally, a retransmission operation according to a hybrid automatic repeat request (HARQ) protocol may be performed in the sidelink communication. However, since the current sidelink communication does not support a blind retransmission operation, a communication protocol for the blind retransmission operation is required.

SUMMARY

Accordingly, exemplary embodiments of the present disclosure provide a method and an apparatus for blind retransmission of sidelink data in a communication system.

According to the exemplary embodiments of the present disclosure, an operation method of a first terminal in a communication system may comprise: transmitting first sidelink control information (SCI) to a second terminal, the first SCI including information indicating time resource(s) for sidelink communication, information indicating frequency resource(s) for the sidelink communication, information indicating a periodicity of physical resources for the sidelink communication, and information indicating a modulation and coding scheme (MCS) for the sidelink communication; transmitting second SCI to the second terminal, the second SCI including information for a hybrid automatic repeat request (HARQ) feedback operation and information indicating a new data indicator (NDI); and performing the sidelink communication with the second terminal based on the first SCI and the second SCI associated with the first SCI.

The operation method may further include, before transmitting the first SCI, receiving a higher layer message from a base station, the higher layer message including information indicating the periodicity of the physical resources for the sidelink communication and information indicating a number of the physical resources configured by the first SCI. One or more information elements included in the first SCI may be configured based on one or more information elements indicated by the higher layer message. The physical resources indicated by the first SCI may be determined autonomously by the first terminal without scheduling of the base station.

Additionally, the operation method may include receiving downlink control information (DCI) from the base station. One or more information elements included in the first SCI are configured based on one or more information elements indicated by the DCI. The first SCI may be used to schedule a retransmission operation of sidelink data, and the sidelink data may be repeatedly transmitted through the physical resources indicated by the first SCI. The second SCI may further include an indicator requesting to stop the sidelink communication scheduled by the first SCI. A combination of one or more information elements among the information for the HARQ feedback operation and the information indicating the NDI, which are included in the second SCI, may request to stop the sidelink communication.

Furthermore, according to the exemplary embodiments of the present disclosure, an operation method of a first terminal in a communication system may include: transmitting first sidelink control information (SCI) to a second terminal, the first SCI including one or more information elements indicating an original configuration for sidelink communication; performing the sidelink communication with the second terminal based on the original configuration indicated by the first SCI; when configuration for the sidelink communication is changed, transmitting second SCI to the second terminal, the second SCI including one or more information elements indicating a changed configuration; and performing the sidelink communication with the second terminal based on the changed configuration indicated by the second SCI.

The operation method may further include receiving a higher layer message from a base station, wherein the one or more information elements included in each of the first SCI and the second SCI are configured based on a plurality of information elements included in the higher layer message. The one or more information elements included in each of the first SCI and the second SCI may be at least one of information indicating time resource(s) for the sidelink communication, information indicating frequency resource (s) for the sidelink communication, information indicating a periodicity of physical resources for the sidelink communication, information indicating a number of the physical resources, and information indicating a modulation and coding scheme (MCS) for the sidelink communication.

The operation method may further include receiving downlink control information (DCI) from a base station, wherein the one or more information elements included in each of the first SCI and the second SCI are configured based on one or more information elements indicated by the DCI. Each of the first SCI and the second SCI may be used to schedule a retransmission operation of sidelink data, and the sidelink data may be repeatedly transmitted through physical resources indicated by each of the first SCI and the second SCI.

Furthermore, according to the exemplary embodiments of the present disclosure, an operation method of a first terminal in a communication system may include: receiving a first message from a base station, the first message including configuration information of a type 1 resource pool; transmitting first sidelink data to a second terminal by using physical resources in the type 1 resource pool without scheduling by sidelink control information (SCI); and transmitting SCI including scheduling information of the first sidelink data to the second terminal.

The configuration information of the type 1 resource pool may include one or more information elements among information indicating that the transmission of the first sidelink data not scheduled by SCI is allowed, information indicating a priority of the first sidelink data transmitted without scheduling by SCI, and information indicating a transmission pattern of the first sidelink data. The type 1 resource pool may be a resource pool allowing the transmission of the first sidelink data not scheduled by SCI, and the type 1 resource pool may be distinguished from a type 2 resource pool not allowing the transmission of the first sidelink data not scheduled by SCI.

The first message may be a higher layer message, a medium access control (MAC) control element (CE) message, or a physical (PHY) layer message. The physical resources may be physical resources scheduled for second sidelink data, and a priority of the second sidelink data may be lower than the priority of the first sidelink data. The SCI may include one or more information elements among information indicating time resource(s) for the first sidelink data, information indicating frequency resource(s) for the first sidelink data, information indicating a periodicity of physical resources for the first sidelink data, information indicating a number of the physical resources for the first sidelink data, and information indicating a modulation and coding scheme (MCS) for the first sidelink data. The SCI may be transmitted after a preconfigured offset from a time of receiving the first message or a time of transmitting the first sidelink data.

According to the exemplary embodiments of the present disclosure, the first terminal may be configured to transmit a first SCI for a blind retransmission operation to the second terminal, and use physical resources indicated by the first SCI to perform a retransmission operation of sidelink data. In addition, the first terminal may be configured to stop the retransmission operation of the sidelink data by transmitting to the second terminal a second SCI requesting to stop the retransmission operation of the sidelink data. Alternatively, when configuration information for the retransmission operation of the sidelink data is changed, the first terminal may be configured to transmit a second SCI including the changed configuration information to the second terminal. Therefore, the retransmission operation of the sidelink data may be efficiently performed in the communication system, and the performance of the communication system may be improved.

BRIEF DESCRIPTION OF DRAWINGS

Exemplary embodiments of the present disclosure will become more apparent by describing in detail exemplary embodiments of the present disclosure with reference to the accompanying drawings, in which.

Figure 1:
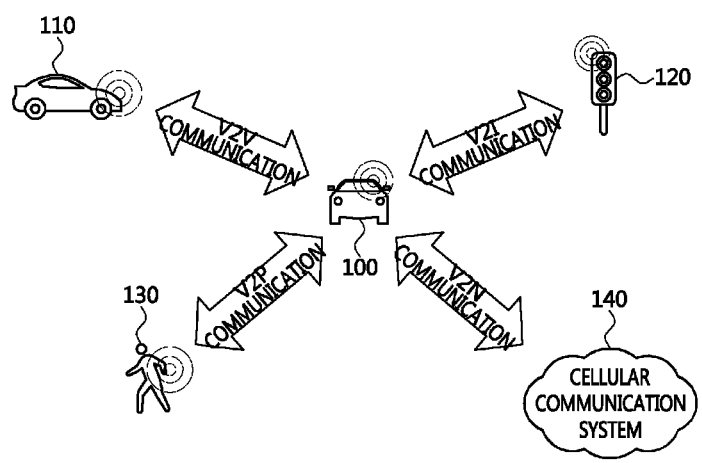
FIG. 1 is a conceptual diagram illustrating V2X communication scenarios according to an exemplary embodiment of the present disclosure.

It should be understood that the above-referenced drawings are not necessarily to scale, presenting a somewhat simplified representation of various features illustrative of the basic principles of the disclosure. The specific design features of the present disclosure, including, for example, specific dimensions, orientations, locations, and shapes, will be determined in part by the particular intended application and use environment.

DETAILED DESCRIPTION

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" or "controller" may refer to a hardware device that includes a memory and a processor. The memory is configured to store program instructions, and the processor is specifically programmed to execute the program instructions to perform one or more processes which are described further below. The control unit may control operation of units, modules, parts, or the like, as described herein. Moreover, it is understood that the below methods may be executed by an apparatus (e.g., communication node) comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, exemplary embodiments of the present disclosure will be described in greater detail with reference to the accompanying drawings. To facilitate general understanding in describing the present disclosure, the same components in the drawings are denoted with the same reference signs, and repeated description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located within the vehicle 100 (e.g., the first vehicle)) and a second vehicle 110 (e.g., a communication node located within the vehicle 110 (e.g., the second vehicle)). Various driving information such as velocity, heading, time, position, and the like may be exchanged between the vehicles 100 and 110 via the V2V communications. For example, autonomous driving (e.g., platooning) may be supported based on the driving information exchanged via the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 via the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located within the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located within the vehicle 100 or the communication node carried by the person 130 may be configured to generate an alarm that indicates a danger by detecting a dangerous situation based on the obtained driving information and movement information.

The V2P communications supported in the cellular communication system 140 may be performed based on sidelink communication technologies (e.g., ProSe and D2D communication technologies, and the like). In particular, the communications between the communication node located within the vehicle 100 and the communication node carried by the person 130 may be performed using at least one sidelink channel established between the communication nodes.

The V2N communications may be communications between the first vehicle 100 (e.g., the communication node located in the vehicle 100) and a server connected via the cellular communication system 140. The V2N communications may be performed based on the 4G communication technology (e.g., LTE or LTE-A) or the 5G communication technology (e.g., NR). In addition, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Figure 2:
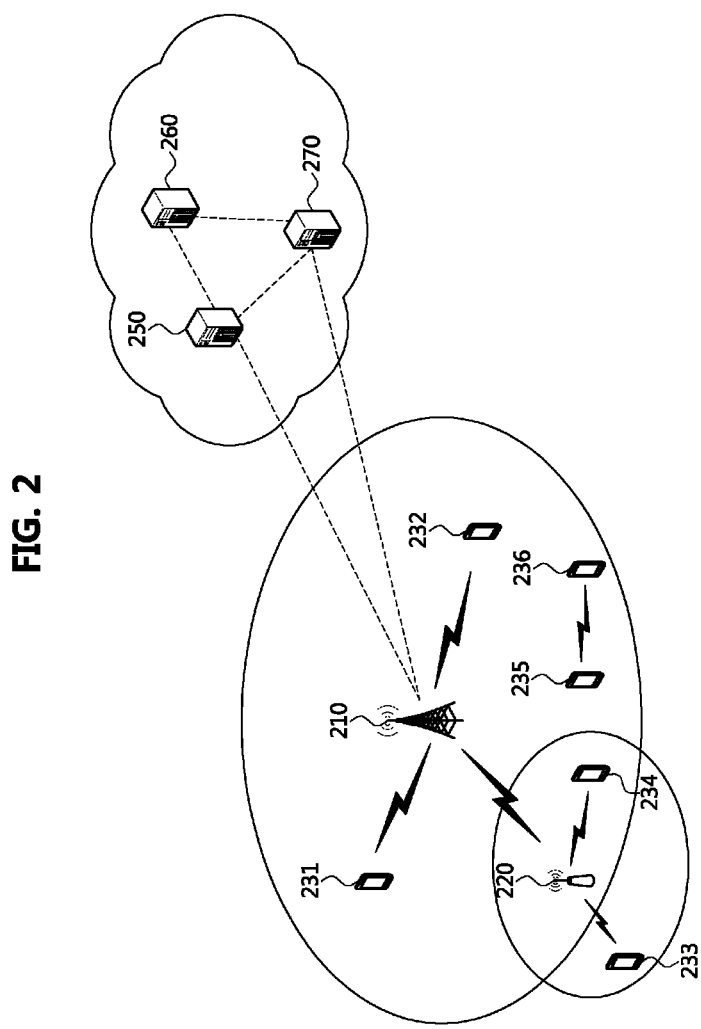
FIG. 2 is a conceptual diagram illustrating a cellular communication system according to an exemplary embodiment of the present disclosure.

Meanwhile, the cellular communication system 140 that supports the V2X communications may be configured as follows. FIG. 2 is a conceptual diagram illustrating exemplary embodiments of a cellular communication system. As shown in FIG. 2, a cellular communication system may include an access network, a core network, and the like. The access network may include a base station 210, a relay 220, User Equipment (UEs) 231 through 236, and the like. The UEs 231 through 236 may include communication nodes located within the vehicles 100 and 110 of FIG. 1, the communication node located within the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Additionally, when the cellular communication system supports a network slicing technique, the core network may be divided into a plurality of logical network slices. For example, a network slice that supports V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) including the cellular communication system may be configured to perform communications using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

Figure 3:
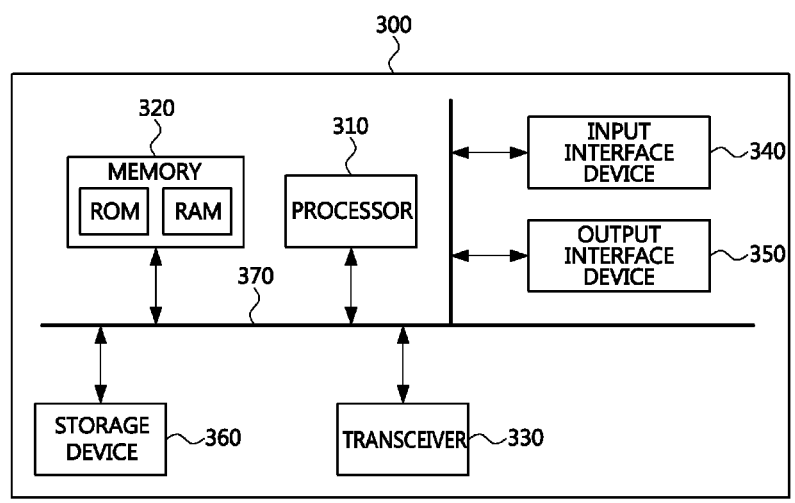
FIG. 3 is a conceptual diagram illustrating a communication node constituting a cellular communication system according to an exemplary embodiment of the present disclosure.

The communication nodes (e.g., base station, relay, UE, S-GW, P-GW, MME, UPF, SMF, AMF, etc.) including the cellular communication system may be configured as follows. FIG. 3 is a conceptual diagram illustrating exemplary embodiments of a communication node constituting a cellular communication system. As shown in FIG. 3, a communication node 300 may include at least one processor 310, a memory 320, and a transceiver 330 connected to a network for performing communications. Additionally, the communication node 300 may further include an input interface device 340, an output interface device 350, a storage device 360, and the like. Each component included in the communication node 300 may be configured to communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with exemplary embodiments of the present disclosure are performed. Each of the memory 320 and the storage device 360 may include at least one of a volatile storage medium and a non-volatile storage medium. For example, the memory 320 may include at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may be configured to communicate with the base station 210 after being connected to the base station 210.

The relay 220 may be connected to the base station 210 and may be configured to relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be disposed outside the cell coverage of the base station 210. The UEs 233 and 234 may be connected to the relay 220 by performing a connection establishment procedure with the relay 220. The UEs 233 and 234 may be configured to communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may be configured to perform operations corresponding to the base station 210 and operations supported by the base station 210. The UEs 233 and 234 may be configured to perform operations that correspond to the relays 220 and operations supported by the relays 220.

Particularly, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station a subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located within the first vehicle 100 of FIG. 1 and the UE 236 may be the communication node located within the second vehicle 110 of FIG. 1. When V2I communications are performed using the sidelink communication technique, the UE 235 may be the communication node located within first vehicle 100 of FIG. 1 and the UE 236 may be the communication node located within the infrastructure 120 of FIG. 1. When V2P communications are performed using the sidelink communication technique, the UE 235 may be the communication node located within first vehicle 100 of FIG. 1 and the UE 236 may be the communication node carried by the person 130 of FIG. 1.

The scenarios to which the sidelink communications are applied may be classified as shown below in Table 1 based on the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
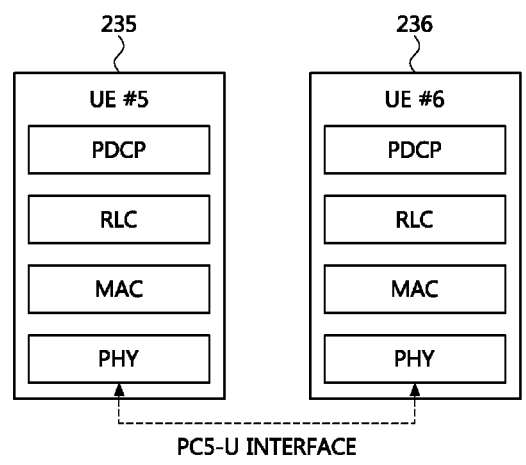
FIG. 4 is a block diagram illustrating a user plane protocol stack of a UE performing sidelink communication according to an exemplary embodiment of the present disclosure.

FIG. 4 is a block diagram illustrating exemplary embodiments of a user plane protocol stack of a UE performing sidelink communication. As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may include a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported. Meanwhile, a control plane protocol stack of the UEs (e.g., the UEs 235 and 236) performing sidelink communications may be configured as follows.

Figure 5:
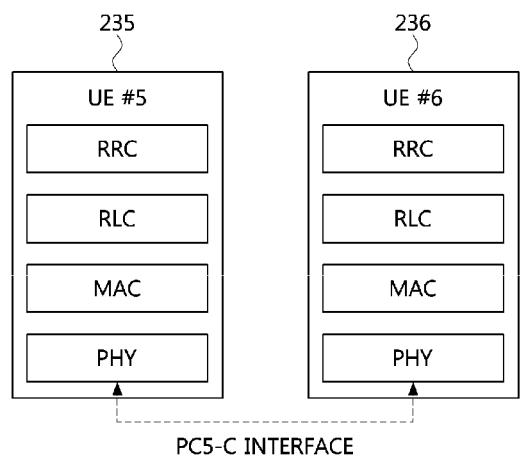
FIG. 5 is a block diagram illustrating a control plane protocol stack of a UE performing sidelink communication according to an exemplary embodiment of the present disclosure.
Figure 6:
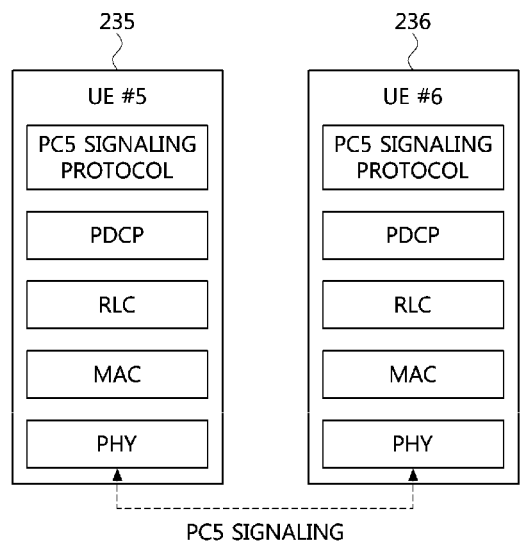
FIG. 6 is a block diagram illustrating a control plane protocol stack of a UE performing sidelink communication according to an exemplary embodiment of the present disclosure.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication. As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). In addition, a demodulation reference signal (DM-RS), a synchronization signal, or the like may be used in the sidelink communications between the UEs 235 and 236. Meanwhile, a sidelink transmission mode (TM) may be classified into sidelink TMs 1 to 4 as shown below in Table 2.

TABLE 2

| Sidelink ™ | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may be configured to perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure, etc.). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. Particularly, the sidelink control information may be transmitted via resources scheduled by the base station 210 within the resource pool configured by the dedicated RRC signaling procedure.

When the sidelink TM 4 is supported, the resource pool used for transmission of the sidelink control information may be configured by a dedicated RRC signaling procedure or a broadcast RRC signaling procedure. In particular, the sidelink control information may be transmitted via resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In particular, the sidelink data may be transmitted and received via resources scheduled by the base station 210. When the sidelink TM 4 is supported, the resource pool for transmitting and receiving sidelink data may be configured by a dedicated RRC signaling procedure or a broadcast RRC signaling procedure. Particularly, the sidelink data may be transmitted and received via resources selected autonomously by the UE (e.g., UE 235 or 236) within the resource pool configured by the dedicated RRC signaling procedure or the broadcast RRC signaling procedure.

Hereinafter, (re)transmission methods for sidelink data in a communication system (e.g., cellular communication system) supporting the above-described V2X communications will be described. Even when a method (e.g., transmission or reception of a signal) to be performed at a first communication node among communication nodes is described, a corresponding second communication node may be configured to perform a method (e.g., reception or transmission of the signal) corresponding to the method performed at the first communication node. In other words, when an operation of a first vehicle is described, a corresponding second vehicle may be configured to perform an operation that corresponds to the operation of the first vehicle. Conversely, when an operation of the second vehicle is described, the corresponding first vehicle may be configured to perform an operation that corresponds to the operation of the second vehicle. In the exemplary embodiments described below, the operation of the vehicle may be the operation of the communication node located in the vehicle.

Retransmission operations of sidelink data in a communication system will be described. The following exemplary embodiments may be applied not only to a retransmission operation of sidelink data, but also to a transmission operation of different sidelink data. In the following exemplary embodiments, the (re)transmission may mean transmission or retransmission.

Figure 7:
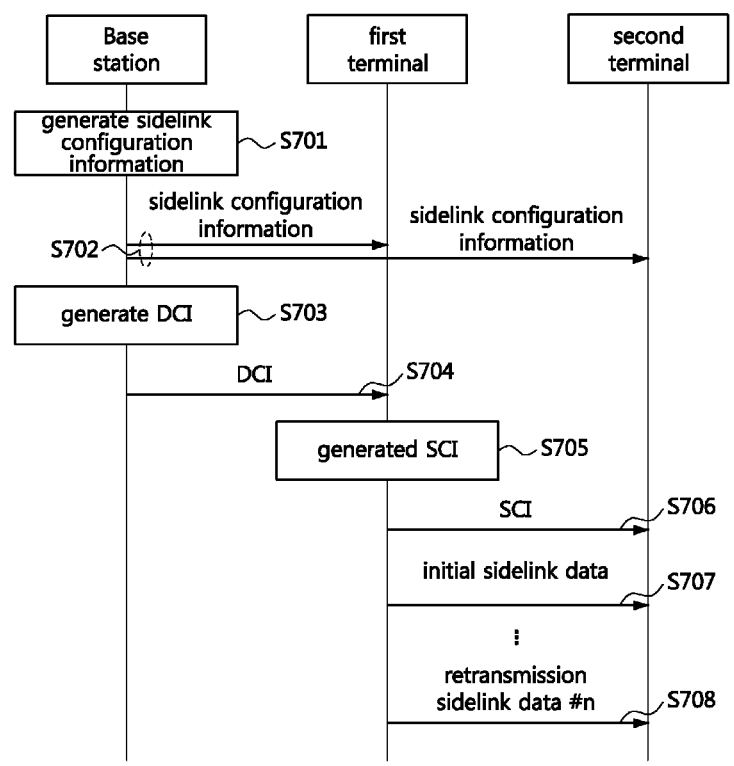
FIG. 7 is a sequence chart illustrating a first exemplary embodiment of a (re)transmission method of sidelink data in a communication system.

FIG. 7 is a sequence chart illustrating a first exemplary embodiment of a (re)transmission method of sidelink data in a communication system. As shown in FIG. 7, a communication system may include a base station, a first terminal, and a second terminal. The base station may be the base station 210 shown in FIG. 2, the first terminal may be the UE 235 shown in FIG. 2, and the second terminal may be the UE 236 shown in FIG. 2. The first terminal and/or the second terminal may be located within the coverage of the base station. Alternatively, the first terminal and/or the second terminal may be located outside the coverage of the base station. Each of the base station, the first terminal, and the second terminal may be configured to be the same as or similar to the communication node 300 shown in FIG. 3. The first terminal and/or the second terminal may support the protocol stacks shown in FIGS. 4 to 6.

The base station may be configured to generate configuration information for sidelink communication (hereinafter referred to as 'sidelink configuration information') (S701). The sidelink configuration information may be configuration information for (re)transmission or blind (re)transmission of sidelink data. The sidelink configuration information may include information element(s) described in Table 3 below.

TABLE 3

| Information element | Description |
| --- | --- |
| Reservation indicator | 'Reservation indicator' indicates whether configuration (e.g., reservation) of a plurality of sidelink resources (e.g., PSCCH and/or PSSCH) is allowed. |
| Number of reserved resources | 'Number of reserved resources' indicates the number (e.g., maximum number) of sidelink resources (e.g., PSCCH and/or PSSCH) configured (e.g., reserved) by an SCI. That is, 'Number of reserved resources' indicates the number of (re)transmissions (e.g., maximum number of (re)transmissions) for sidelink data. |
| Reserved resource periodicity | 'Reserved resource periodicity' indicates a periodicity of sidelink resources configured (e.g., reserved) by an SCI. That is, 'Reserved resource periodicity' indicates a (re)transmission periodicity of sidelink data. |
| MCS index | 'MCS index' indicates an MCS used for (re)transmission of sidelink data. |
| RV information | 'RV information' indicates an RV pattern used for (re)transmission of sidelink data. |
| HARQ indicator | 'HARQ indicator' indicates whether an HARQ feedback operation is performed in a (re)transmission procedure of sidelink data. |

The reservation indicator may be referred to as 'sl-MultiReserveResource'. The size of the reservation indicator may be 1 bit. The reservation indicator set to '0' may indicate that configuration (e.g., reservation) of a plurality of sidelink resources (e.g., PSCCH and/or PSSCH) is not allowed. The reservation indicator set to '1' may indicate that configuration (e.g., reservation) of a plurality of sidelink resources (e.g., PSCCH and/or PSSCH) is allowed. When the reservation indicator is set to '1', an SCI may include scheduling information regarding a plurality of sidelink resources. In particular, the sidelink resources may refer to physical resources (e.g., time resources, frequency resources).

The number of reserved resources may be referred to as 'sl-MaxNumPerReserve' The number of reserved resources may be preconfigured as a set of the numbers of resources that can be reserved. For example, the number of reserved resources may be configured as {2, 3, 4, 5}. In particular, an SCI may include a field indicating one of 2, 3, 4, and 5. Alternatively, the number of reserved resources may indicate one value. For example, the 'number of reserved resources' set to '2' may indicate that two (e.g., up to two) sidelink resources (e.g., PSCCH and/or PSSCH) may be reserved, and the 'number of reserved resources' set to '3' may indicate that three (e.g., up to three) sidelink resources (e.g., PSCCH and/or PSSCH) may be reserved. The number of reserved resources may indicate the number of sidelink resources including a sidelink resource (e.g., PSSCH) used for initial transmission. Alternatively, the number of reserved resources may indicate the number of sidelink resources (e.g., sidelink resources used for retransmission) excluding the sidelink resource used for initial transmission.

The reserved resource periodicity may be referred to as 'SL-ResourceReservePeriod'. The reserved resource periodicity may be preconfigured as a set of candidate periodicities. For example, the reserved resource periodicity may be configured as a set of {1 ms, 2 ms, 4 ms, 5 ms} or a set of {1 ms, 2 ms, 3 ms, 4 ms, 5 ms, 6 ms, 7 ms, 8 ms, 9 ms, 10 ms}. In this case, an SCI may include a field indicating one periodicity among the candidate periodicities. Alternatively, the reserved resource periodicity may indicate one value. For example, when the reserved resource periodicity indicates 2 milliseconds (ms), the periodicity of the sidelink resources (e.g., a periodicity of consecutive PSSCHs, a periodicity of a PSCCH and a PSSCH, or a periodicity of consecutive PSCCHs) may be 2 ms.

The modulation and coding scheme (MCS) index may be preconfigured as a set of usable MCS levels. For example, the MCS index may be configured as a set of {0, 1, 2, 3}. In particular, an SCI may include a field indicating one of 0, 1, 2, and 3. Alternatively, the MCS index may indicate one MCS index used for sidelink communication.

The RV information may be configured based on a value indicated by the number of reserved resources. For example, when the number of reserved resources indicates that two sidelink resources may be configured, an RV pattern indicated by the RV information may be 0 or 2. In particular, sidelink data according to the RV 0 may be transmitted through a PSSCH #1, and sidelink data according to the RV 2 may be transmitted through a PSSCH #2. Alternatively, when the number of reserved resources indicates that three sidelink resources can be configured, an RV pattern indicated by the RV information may be 0, 2, or 3. Sidelink data according to the RV 0 may be transmitted through a PSSCH #1, sidelink data according to the RV 2 may be transmitted through a PSSCH #2, and sidelink data according to the RV 3 may be transmitted through a PSSCH #2.

The size of the HARQ indicator may be 1 bit. The HARQ indicator set to '0' may indicate that an HARQ feedback operation is not performed in sidelink communication. The HARQ indicator set to '1' may indicate that the HARQ feedback operation is performed in sidelink communication.

The information element(s) described in Table 3 may be cell-specific information element(s), terminal-specific (i.e., UE-specific) information element(s), and/or resource pool-specific information element(s). Alternatively, the sidelink configuration information may include information element(s) described in Table 4 below instead of Table 3.

TABLE 4

| Information element | Description |
| --- | --- |
| Blind (re)transmission mode #1 | Reservation indicator: 1 (enable) Number of reserved resources: 2 Reserved resource periodicity: 1 ms MCS index: 0 RV information: {0, 2} HARQ indicator: 0 or 1 |
| Blind (re)transmission mode #2 | Reservation indicator: 1 (enable) Number of reserved resources: 4 Reserved resource periodicity: 1 ms MCS index: 2 RV information: {0, 2, 3, 1} HARQ indicator: 0 or 1 |
| Blind (re)transmission mode #3 | Reservation indicator: 1 (enable) Number of reserved resources: 3 Reserved resource periodicity: 2 ms MCS index: 3 RV information: {0, 2} HARQ indicator: 0 or 1 |

TABLE 4-continued

| Information element | Description |
| --- | --- |
| Blind (re)transmission mode #4 | Reservation indicator: 1 (enable)<br>Number of reserved resources: 4<br>Reserved resource periodicity: 4 ms<br>MCS index: 3<br>RV information: {0, 2, 3, 1}<br>HARQ indicator: 0 or 1 |

Each of the blind (re)transmission modes may include one or more information elements among the reservation indicator, the number of reserved resources, the reserved resource periodicity, the MCS index, the RV information, and the HARQ indicator. Each of the one or more information elements included in each blind (re)transmission mode may indicate one value. For example, in the blind (re)transmission mode #1, the number of reserved resources may be set to 2, the reserved resource periodicity may be set to 1 ms, and the MCS index may be set to 0. The sidelink configuration information may include a plurality of blind (re)transmission modes (e.g., blind (re)transmission modes #1 to #4). In particular, an SCI may include a field indicating one of the blind (re)transmission modes #1 to #4. Alternatively, the sidelink configuration information may include one blind (re)transmission mode.

The blind (re)transmission mode(s) listed in Table 4 may be cell-specific blind (re)transmission mode(s), terminal-specific blind (re)transmission mode(s), and/or resource pool-specific blinds (re)transmission mode(s). The blind (re)transmission mode(s) may be mapped to a coverage or specific metric (e.g., channel quality indicator (CQI)) of the base station. The blind (re)transmission mode(s) may be configured for each coverage of the base station. For example, when the coverage of the base station is greater than or equal to a threshold, the blind (re)transmission mode #4 may be used. When the coverage of the base station is less than a threshold, the blind (re)transmission mode #3 may be used. Additionally, the blind (re)transmission mode(s) may be configured for each CQI. For example, when the CQI is greater than or equal to a threshold, the blind (re)transmission mode #2 may be used. When the CQI is less than a threshold, the blind (re)transmission mode #1 may be used.

Meanwhile, the base station may be configured to transmit a higher layer message including the information element(s) described in Table 3 or Table 4 (S702). The higher layer message may include system information (e.g., system information block (SIB)) and/or an RRC message. The terminals (e.g., the first terminal and the second terminal) may be configured to receive the higher layer message from the base station, and identify the sidelink configuration information included in the higher layer message. The sidelink configuration information may include the information element(s) described in Table 3 or the information element(s) described in Table 4.

When the sidelink TM #1 or #3 is used (e.g., when sidelink communication is performed based on scheduling of the base station), the base station may be configured to generate downlink control information (DCI) including information element(s) necessary for transmission and reception of sidelink data (S703). The DCI may include information element(s) described in Table 5 below.

TABLE 5

| Information element | Description |
| --- | --- |
| Priority | 'Priority' indicates a priority of sidelink data scheduled by an SCI |
| Number of reserved resources | 'Number of reserved resources' indicates the number (e.g., maximum number) of sidelink resources (e.g., PSCCH and/or PSSCH) configured (e.g., reserved) by an SCI. That is, 'Number of reserved resources' indicates the number of (re)transmissions (e.g., maximum number of (re)transmissions) for sidelink data. |
| Reserved resource periodicity | 'Reserved resource periodicity' indicates a periodicity of sidelink resources configured (e.g., reserved) by an SCI. That is, 'Reserved resource periodicity' indicates a (re)transmission periodicity of sidelink data. |
| Frequency resource allocation | 'Frequency resource allocation' indicates frequency resources allocated for transmission/reception of sidelink data. |
| Time resource allocation | 'Time resource allocation' indicates time resources allocated for transmission/reception of sidelink data. |
| Blind (re)transmission mode | 'Blind (re)transmission mode' indicates a blind (re)transmission mode used for transmission/reception of sidelink data. |
| MCS index | 'MCS index' indicates an MCS used for transmission/reception of sidelink data. |
| RV information | 'RV information' indicates an RV pattern used for (re)transmission of sidelink data. |
| HARQ indicator | 'HARQ indicator' indicates whether an HARQ feedback operation is performed in a (re)transmission procedure of sidelink data. |
| HARQ process ID | 'HARQ process ID' is used for identifying an HARQ process in a (re)transmission procedure of sidelink data. |
| NDI | 'NDI' indicates whether new data is transmitted. |

The base station may be configured to determine information element(s) included in the DCI based on the sidelink configuration information. For example, when the number of reserved resources included in the sidelink configuration information is configured as a set of {2, 3, 4, 5}, the 'number of reserved resources' included in DCI may indicate one of 2, 3, 4, and 5. In particular, the size of the field indicating the number of reserved resources included in the DCI may be 2 bits. When the reserved resource periodicity included in the sidelink configuration information is configured as a set of {1 ms, 2 ms, 4 ms, 5 ms}, the reserved resource periodicity included in the DCI may indicate one of 1 ms, 2 ms, 4 ms, and 5 ms. The size of the field indicating the reserved resource periodicity included in DCI may be 2 bits.

When the MCS index included in the sidelink configuration information is 0, 1, 2, or 3, the MCS index included in the DCI may indicate one of 0, 1, 2, and 3. In particular, the size of the field indicating the MCS index included in the DCI may be 2 bits. When the sidelink configuration information indicates the blind (re)transmission modes #1 to #4, the blind (re)transmission mode included in the DCI may indicate one of the blind (re)transmission modes #1 to #4. The size of the field indicating the blind (re)transmission mode included in the DCI may be 2 bits.

The first terminal may be a source terminal transmitting sidelink data, and the second terminal may be a destination terminal receiving the sidelink data. In particular, the base station may be configured to transmit the DCI to the first terminal (S704). The DCI may be transmitted from the base station to the first terminal via a PDCCH. The first terminal may be configured to receive the DCI from the base station, and may be configured to identify the information element(s) included in the DCI (e.g., the information element(s) described in Table 5).

The first terminal may be configured to generate an SCI including the information element(s) included in the DCI (S705). The first terminal may be configured to transmit the SCI to the second terminal (S706). In the following exemplary embodiments, the second terminal may refer to a plurality of terminals including the second terminal. The SCI may be transmitted from the first terminal to the second terminal via a PSCCH. The second terminal may be configured to receive the SCI from the first terminal, and may be configured to identify the information element(s) (e.g., information element(s) described in Table 5) included in the SCI.

Meanwhile, when the sidelink TM #2 or #4 is used (e.g., when UE autonomous transmission is supported), the first terminal may be configured to generate an SCI including information element(s) necessary for transmission and reception of sidelink data without receiving a DCI (S705). In particular, the steps S703 and S704 may be omitted. The SCI may include the information element(s) described in Table 5. The information element(s) included in the SCI may be determined identically or similarly to the DCI generation method described above. The first terminal may be configured to transmit the SCI to the second terminal (S706). The SCI may be transmitted from the first terminal to the second terminal via a PSCCH. The second terminal may be configured to receive the SCI from the first terminal, and may be configured to identify the information element(s) (e.g., information element(s) described in Table 5) included in the SCI.

When one of the sidelink TMs #1 to #4 is used, the first terminal may use a sidelink resource (e.g., PSSCH #1) indicated by the SCI to transmit sidelink data to the second terminal (S707). The second terminal may be configured to receive the sidelink data from the first terminal by performing a monitoring operation on the sidelink resource indicated by the SCI. The sidelink data transmitted and received in the step S707 may be initial sidelink data.

When the retransmission operation (e.g., blind retransmission operation) of the sidelink data is supported (e.g., when the SCI indicates that the retransmission operation (e.g., blind retransmission operation) of the sidelink data is supported), the first terminal may be configured to transmit retransmission sidelink data #n to the second terminal by using one or more sidelink resources (e.g., PSSCH #n) indicated by the SCI (S708). In particular, n may be an integer equal to or greater than 2. The second terminal may be configured to receive the retransmission sidelink data from the first terminal by performing a monitoring operation on the one or more sidelink resources (e.g., PSSCH #n) indicated by the SCI. As another exemplary embodiment, different sidelink data may be transmitted in the steps S707 and S708. In other words, the first terminal may transmit different sidelink data to the second terminal by using the sidelink resources indicated by the SCI.

Figure 8:
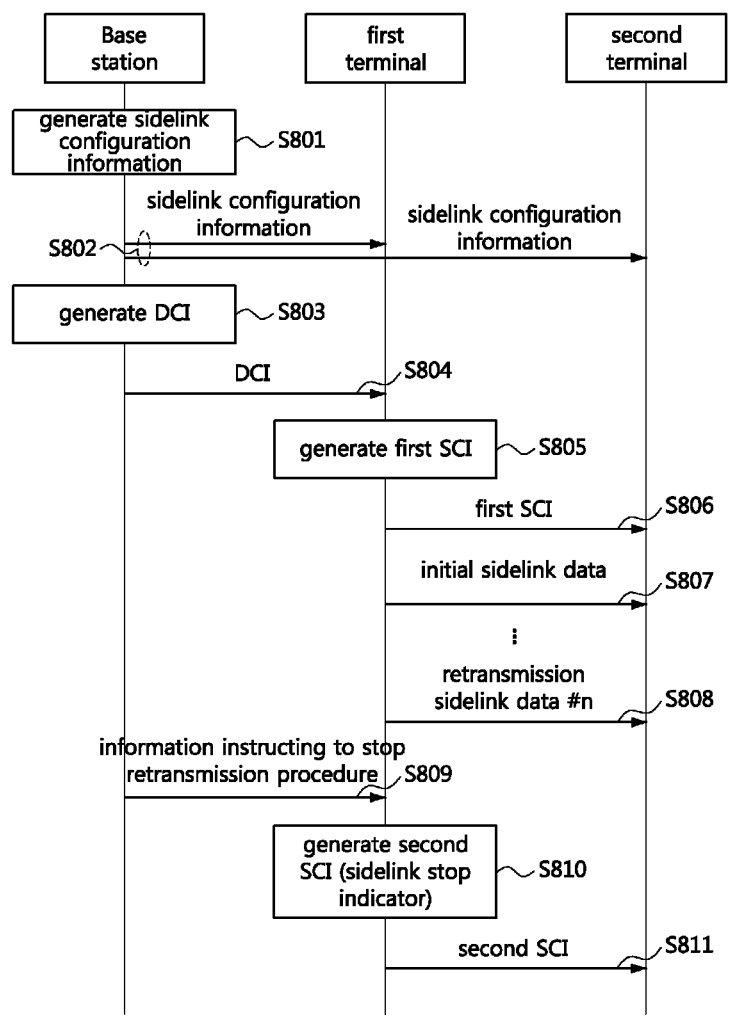
FIG. 8 is a sequence chart illustrating a second exemplary embodiment of a (re)transmission method of sidelink data in a communication system.

FIG. 8 is a sequence chart illustrating a second exemplary embodiment of a (re)transmission method of sidelink data in a communication system. As shown in FIG. 8, a communication system may include a base station, a first terminal, and a second terminal. The base station may be the base station 210 shown in FIG. 2, the first terminal may be the UE 235 shown in FIG. 2, and the second terminal may be the UE 236 shown in FIG. 2. The first terminal and/or the second terminal may be located within the coverage of the base station. Alternatively, the first terminal and/or the second terminal may be located outside the coverage of the base station. Each of the base station, the first terminal, and the second terminal may be configured to be the same as or similar to the communication node 300 shown in FIG. 3. The first terminal and/or the second terminal may support the protocol stacks shown in FIGS. 4 to 6.

Steps S801 to S808 may be the same as the steps S701 to S708 shown in FIG. 7. A first SCI in the steps S805 and S806 may be the same as the SCI in the steps S705 and S706 shown in FIG. 7. A retransmission procedure (e.g., blind retransmission procedure) of sidelink data may be performed between the first terminal and the second terminal. The retransmission procedure of the sidelink data may be scheduled by the first SCI. During the execution of the retransmission procedure of the sidelink data, the base station and/or the first terminal may be configured to determine to stop the retransmission procedure of the sidelink data.

When the base station determines to stop the retransmission procedure of the sidelink data, the base station may be configured to transmit to the first terminal information instructing to stop the retransmission procedure of the sidelink data through a combination of one or more among a higher layer message (e.g., system information and/or RRC message), a MAC message (e.g., MAC control element (CE)), and a PHY layer message (e.g., DCI) (S809). The first terminal may be configured to receive the information instructing to stop the retransmission procedure of the sidelink data from the base station. Alternatively, the first terminal may be configured to determine to stop the retransmission procedure of the sidelink data. In particular, the step S809 may be omitted.

The first terminal may be configured to generate a second SCI to instruct to stop the retransmission procedure of sidelink data (S810). The second SCI may be used to release sidelink resources allocated by the first SCI. In other words, a plurality of SCIs may be used for sidelink communication. In particular, the first SCI may be a '1st-stage SCI' and the second SCI may be a '2nd-stage SCI'. The second SCI may include one or more of a HARQ process ID, a new data indicator (NDI), and RV information. The second SCI used to instruct to stop the sidelink retransmission procedure may not include information (e.g., scheduling information) for transmission of new sidelink data (e.g., PSSCH).

The second SCI may include information (hereinafter, referred to as 'sidelink stop indicator') instructing to stop the retransmission procedure of the sidelink data. The sidelink stop indicator may be associated with HARQ feedback information (e.g., information enabling or disabling the HARQ feedback procedure) included in the second SCI. The HARQ feedback information may refer to an HARQ process ID. For example, the HARQ process ID included in the second SCI may be used as the sidelink stop indicator.

Alternatively, the NDI included in the second SCI may be used as the sidelink stop indicator. Particularly, when the HARQ feedback procedure is disabled, the NDI included in the second SCI may be used as the sidelink stop indicator. Alternatively, a combination of the above-described methods may be used as the sidelink stop indicator. For example, when the HARQ process ID (e.g., HARQ feedback information) included in the second SCI is set to a first value, and the NDI included in the second SCI is set to a second value, a combination of the first value and the second value may be used as the sidelink stop indicator.

When information element included in configuration information of a resource pool allocated to the terminal(s) indicates that the blind (re)transmission operation is allowed, the blind (re)transmission operation may be set to a default (re)transmission operation in the corresponding resource pool. In particular, the HARQ feedback procedure may not be performed in the corresponding resource pool. Therefore, HARQ feedback information included in the second SCI may be used to express the sidelink stop indicator.

The first terminal may be configured to transmit the second SCI to the second terminal (S811). The second SCI may be transmitted via a sidelink resource (e.g., PSCCH and/or PSSCH). When the second SCI is transmitted via a PSSCH, the PSSCH through which the second SCI is transmitted may be a PSSCH scheduled by the first SCI. The second terminal may be configured to receive the second SCI from the first terminal, and may be configured to identify the sidelink stop indicator based on the information element or a combination of the information elements included in the second SCI. When the second SCI includes the sidelink stop indicator, the second terminal may be configured to determine that the retransmission procedure of the sidelink data is required to be stopped. Therefore, the second terminal may not perform the sidelink data reception operation, and may release the sidelink resources configured for the sidelink data retransmission procedure. In addition, the first terminal may not perform the (re)transmission operation of sidelink data after transmitting the second SCI, and may release the sidelink resources configured for the retransmission procedure of the sidelink data.

Figure 9:
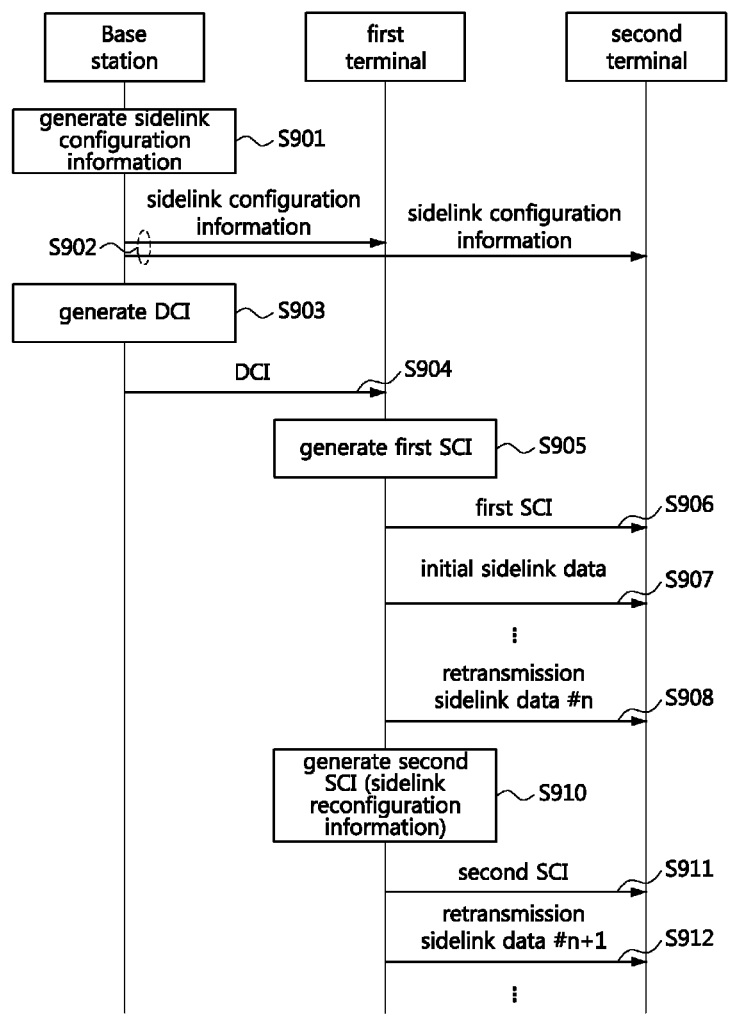
FIG. 9 is a sequence chart illustrating a third exemplary embodiment of a (re)transmission method of sidelink data in a communication system.

FIG. 9 is a sequence chart illustrating a third exemplary embodiment of a (re)transmission method of sidelink data in a communication system. As shown in FIG. 9, a communication system may include a base station, a first terminal, and a second terminal. The base station may be the base station 210 shown in FIG. 2, the first terminal may be the UE 235 shown in FIG. 2, and the second terminal may be the UE 236 shown in FIG. 2. The first terminal and/or the second terminal may be located within the coverage of the base station. Alternatively, the first terminal and/or the second terminal may be located outside the coverage of the base station. Each of the base station, the first terminal, and the second terminal may be configured to be the same as or similar to the communication node 300 shown in FIG. 3. The first terminal and/or the second terminal may support the protocol stacks shown in FIGS. 4 to 6.

Steps S901 to S908 may be the same as the steps S701 to S708 shown in FIG. 7. A first SCI in the steps S905 and S906 may be the same as the SCI in the steps S705 and S706 shown in FIG. 7. A retransmission procedure (e.g., blind retransmission procedure) of sidelink data may be performed between the first terminal and the second terminal. The retransmission procedure of the sidelink data may be scheduled by the first SCI. During execution of the retransmission procedure of the sidelink data, it may be necessary to change configuration information for retransmission of the sidelink data. The configuration information for retransmission of the sidelink data may include one or more information elements among the frequency resource allocation, time resource allocation, number of reserved resources, reserved resource periodicity, MCS index, and RV information. Particularly, the number of reserved resources may indicate the number of remaining transmissions.

After transmission of retransmission sidelink data #n (e.g., after the step S908), the first terminal may be configured to determine that it is necessary to change the configuration information for retransmission of the sidelink data. Alternatively, the first terminal may be configured to determine that it is necessary to change the configuration information for retransmission of the sidelink data even before the step S908.

The first terminal may be configured to reconfigure the configuration information for retransmission of the sidelink data, and generate a second SCI including reconfiguration information for retransmission of the sidelink data (hereinafter referred to as 'sidelink reconfiguration information') (S910). The first terminal may be configured to transmit the second SCI to the second terminal using a sidelink resource (e.g., PSCCH and/or PSSCH) (S911). When the second SCI is transmitted via a PSSCH, the PSSCH through which the second SCI is transmitted may be a PSSCH scheduled by the first SCI.

The sidelink reconfiguration information may be indicated by a second SCI associated with a higher layer message (e.g., system information and/or RRC message). For example, the sidelink reconfiguration information included in the second SCI may be configured within the sidelink configuration information (e.g., sidelink original configuration information) indicated by the higher layer signaling message. Particularly, the higher layer message may be a higher layer message independent of the higher layer message (e.g., system information and/or RRC message) transmitted in the step S902, and may be transmitted from the base station before the step S910. The higher layer message for reconfiguring the sidelink configuration information may include the information element(s) described in Table 3 or Table 4. Alternatively, the sidelink reconfiguration information may be indicated by the second SCI regardless of the higher layer message.

The second terminal may be configured to receive the second SCI from the first terminal, and identify the sidelink reconfiguration information included in the second SCI. The retransmission procedure of the sidelink data after the step S911 may be performed using the sidelink reconfiguration information included in the second SCI. For example, the first terminal may be configured to transmit retransmission sidelink data #n+1 to the second terminal by using the sidelink reconfiguration information included in the second SCI instead of the first SCI (S912). The second terminal may be configured to receive the retransmission sidelink data #n+1 using the sidelink reconfiguration information included in the second SCI.

Figure 10:
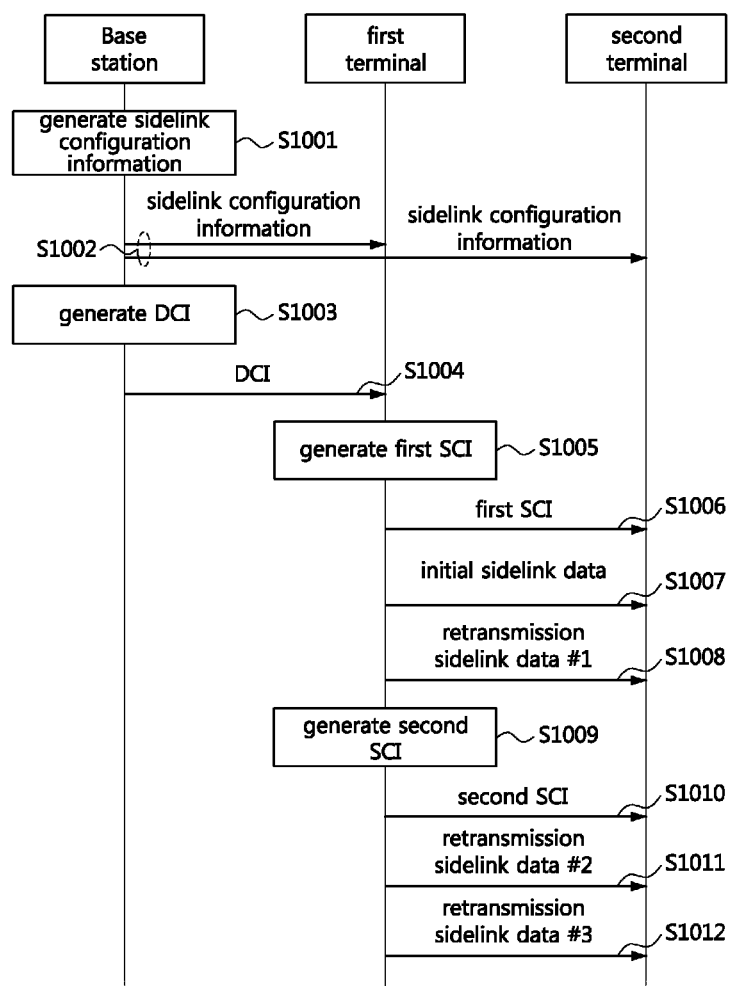
FIG. 10 is a sequence chart illustrating a fourth exemplary embodiment of a (re)transmission method of sidelink data in a communication system.

FIG. 10 is a sequence chart illustrating a fourth exemplary embodiment of a (re)transmission method of sidelink data in a communication system. As shown in FIG. 10, a communication system may include a base station, a first terminal, and a second terminal. The base station may be the base station 210 shown in FIG. 2, the first terminal may be the UE 235 shown in FIG. 2, and the second terminal may be the UE 236 shown in FIG. 2. The first terminal and/or the second terminal may be located within the coverage of the base station. Alternatively, the first terminal and/or the second terminal may be located outside the coverage of the base station. Each of the base station, the first terminal, and the second terminal may be configured to be the same as or similar to the communication node 300 shown in FIG. 3. The first terminal and/or the second terminal may support the protocol stacks shown in FIGS. 4 to 6.

Steps S1001 to S1008 may be the same as the steps S701 to S708 shown in FIG. 7. A first SCI in the steps S1005 and S1006 may be the same as the SCI in the steps S705 and S706 shown in FIG. 7. A retransmission procedure (e.g., blind retransmission procedure) of sidelink data may be performed between the first terminal and the second terminal. The retransmission procedure of the sidelink data may be scheduled by the first SCI.

Sidelink communication between the first terminal and a plurality of terminals may be performed based on an SCI (e.g., first SCI), and some of the plurality of terminals may not receive the SCI. In particular, sidelink communication between some terminals and the first terminal may not be performed. To solve this problem, the first terminal may be configured to repeatedly transmit the SCI (e.g., the same SCI). The SCI may be repeatedly transmitted according to a preset periodicity. The preset periodicity for the repetitive transmission of the SCI may be included in the sidelink configuration information of the step S1002. Alternatively, the preset periodicity for the repetitive transmission of the SCI may be included in the first SCI in the step S1006.

When the preset periodicity is 2, the first terminal may be configured to transmit the SCI again after transmitting the sidelink data (e.g., PSSCH) twice. For example, the first terminal may be configured to generate a second SCI after the step S1008 (S1009), and transmit the generated second SCI (S1010). The information element(s) included in the second SCI may be the same as the information element(s) included in the first SCI. Alternatively, the second SCI may include one or more information elements among all the information elements included in the first SCI. Alternatively, the second SCI may include information element(s) not included in the first SCI. For example, the second SCI may include information indicating the number of completed (re)transmissions of the sidelink data until the step S1009 and/or information indicating the number of remaining (re)transmissions of the sidelink data after the step S1010. The information element(s) included in the second SCI may be associated with the higher layer signaling.

The second terminal may be configured to receive the second SCI from the first terminal. For example, the terminal(s) that have not received the first SCI may be configured to receive the second SCI. Sidelink communication between the first terminal and the second terminal may be performed based on the information element(s) included in the second SCI. The first terminal may be configured to transmit retransmission sidelink data #2 based on the information element(s) included in the second SCI (S1011). The second terminal may be configured to receive the retransmission sidelink data #2 from the first terminal based on the information element(s) included in the second SCI. Additionally, the first terminal may be configured to transmit retransmission sidelink data #3 based on the information element(s) included in the second SCI (S1012). The second terminal may be configured to receive the retransmission sidelink data #3 from the first terminal based on the information element(s) included in the second SCI.

Figure 11:
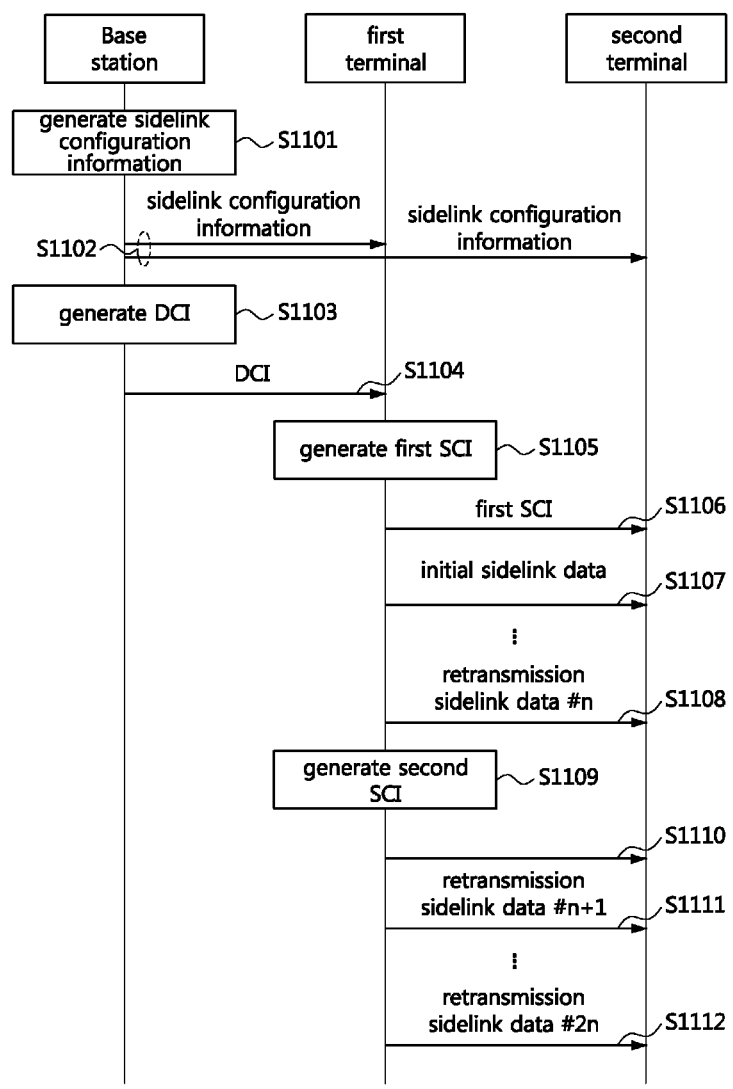
FIG. 11 is a sequence chart illustrating a fifth exemplary embodiment of a (re)transmission method of sidelink data in a communication system.

FIG. 11 is a sequence chart illustrating a fifth exemplary embodiment of a (re)transmission method of sidelink data in a communication system. As shown in FIG. 11, a communication system may include a base station, a first terminal, and a second terminal. The base station may be the base station 210 shown in FIG. 2, the first terminal may be the UE 235 shown in FIG. 2, and the second terminal may be the UE 236 shown in FIG. 2. The first terminal and/or the second terminal may be located within the coverage of the base station. Alternatively, the first terminal and/or the second terminal may be located outside the coverage of the base station. Each of the base station, the first terminal, and the second terminal may be configured to be the same as or similar to the communication node 300 shown in FIG. 3. The first terminal and/or the second terminal may support the protocol stacks shown in FIGS. 4 to 6.

Steps S1101 to S1108 may be the same as the steps S701 to S708 shown in FIG. 7. A first SCI in the steps S1105 and S1106 may be the same as the SCI in the steps S705 and S706 shown in FIG. 7. A retransmission procedure (e.g., blind retransmission procedure) of sidelink data may be performed between the first terminal and the second terminal. The retransmission procedure of the sidelink data may be scheduled by the first SCI. The sidelink data may be repeatedly transmitted n times based on the information element(s) included in the first SCI. Particularly, n may be an integer equal to or greater than 2.

Thereafter, the first terminal may be configured to generate a second SCI including information indicating additional repetitive transmissions (S1109), and transmit the generated second SCI to the second terminal (S1110). For example, the second SCI may include an information element indicating n repetitive transmissions of the sidelink data. An HARQ process ID, an NDI, or RV information included in the second SCI may indicate additional repetitive transmissions of the sidelink data. Alternatively, a combination of two or more information elements among the HARQ process ID, the NDI, and the RV information included in the second SCI may indicate additional repetitive transmissions of the sidelink data.

The second SCI may not indicate the number of repetitive transmissions of the sidelink data. In other words, the second SCI may include information indicating that the repetitive transmissions of the sidelink data are additionally performed without the number of repetitive transmissions. In particular, the sidelink data indicated by the second SCI may be transmitted by the number of repetitive transmissions indicated by the first SCI (e.g., the number of reserved resources). In other words, the second SCI may indicate that the repetitive transmissions of sidelink data are additionally performed, and the repetitive transmissions of the sidelink data indicated by the second SCI may be performed based on the information element(s) included in the first SCI.

According to the second SCI, the sidelink data may be repeatedly transmitted n additional times. In other words, the first terminal may increase the number of repetitive transmissions of the sidelink data using the second SCI when necessary. In addition, the second SCI may further include one or more information elements among the frequency resource allocation, time resource allocation, number of reserved resources, reserved resource periodicity, MCS index, and RV information. The information element(s) included in the second SCI may be configured differently from the information element(s) included in the first SCI. For example, the time resource allocation indicated by the second SCI may be different from the time resource allocation indicated by the first SCI, and the number of reserved resources indicated by the second SCI may be different from the number of reserved resources indicated by the first SCI.

The second terminal may be configured to receive the second SCI from the first terminal, and identify the information element(s) included in the second SCI. For example, the second terminal may be configured to identify that the sidelink data is additionally repeatedly transmitted based on the information element(s) included in the second SCI. Additionally, the second terminal may be configured to identify the sidelink configuration information included in the second SCI. The sidelink communication between the first terminal and the second terminal may be performed based on information element(s) included in the second SCI. For example, the first terminal may be configured to retransmit sidelink data (e.g., retransmission sidelink data #n+1 to #2n) to the second terminal based on the information element(s) included in the second SCI (S1111, S1112). The second terminal may be configured to receive the retransmission sidelink data (e.g., retransmission sidelink data #n+1 to #2n) based on the information element(s) included in the second SCI.

The (re)transmission method of the sidelink data shown in FIG. 11 may be combined with the (re)transmission method of the sidelink data shown in FIG. 9, and the combined method may be used. In the exemplary embodiments shown in FIGS. 8 to 11, a common SCI having one or more uses may be defined. The information element(s) included in the common SCI may vary depending on the use. A new SCI format may be configured according to the use. When the SCI is periodically transmitted in the exemplary embodiment illustrated in FIG. 10, the use of each of the SCIs may be different, and each of the SCIs having different uses may include different information element(s).

Meanwhile, to satisfy the URLLC requirements (e.g., low-latency requirements and/or high-reliability requirements), the aforementioned (re)transmission procedure (e.g., blind (re)transmission procedure) may be used. When sidelink data needs to be transmitted for public safety, the above-mentioned (re)transmission procedure (e.g., blind (re) transmission procedure) may be used. The sidelink data may be (re)transmitted in a unicast scheme, a broadcast scheme, and/or a groupcast scheme. The sidelink data may be (re) transmitted based on the information element(s) described in Table 3, Table 4, or Table 5. The SCI may include the information element(s) described in Table 3, Table 4, or Table 5, and the sidelink data may be (re)transmitted through sidelink resources (e.g., PSSCH) indicated by the SCI.

The terminal may be configured to transmit sidelink data (e.g., other sidelink data) by using a scheduled resource or a sensed resource for transmission of the other sidelink data. In particular, the terminal may be configured to transmit the sidelink data through the corresponding resource without scheduling by an SCI. After transmitting the sidelink data, the terminal may be configured to transmit an SCI including scheduling information of the corresponding sidelink data. In other words, the SCI may be transmitted after transmission of the sidelink data scheduled by the corresponding SCI. Particularly, a transmission type and/or a transmission pattern of the sidelink data in the scheduled resource or the sensed resource may be preconfigured. The transmission type and/or transmission pattern of the sidelink data may be pre-defined by using a configuration table, and the base station may be configured to inform the information of the configuration table to the terminal by using a combination of one or more of a higher layer message, a MAC message, and a PHY layer message. The above-described operation may be performed as follows.

Figure 12:
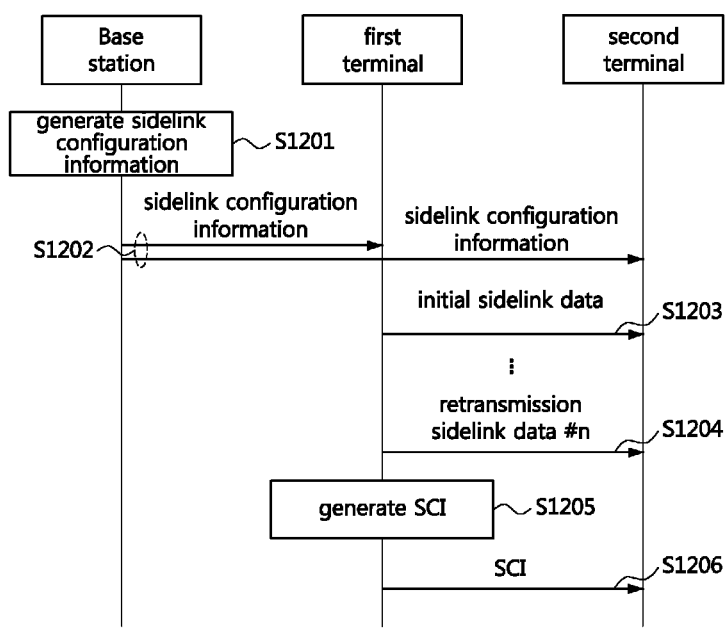
FIG. 12 is a sequence chart showing a sixth exemplary embodiment of a (re)transmission method of sidelink data in a communication system.

FIG. 12 is a sequence chart showing a sixth exemplary embodiment of a (re)transmission method of sidelink data in a communication system. As shown in FIG. 12, a communication system may include a base station, a first terminal, and a second terminal. The base station may be the base station 210 shown in FIG. 2, the first terminal may be the UE 235 shown in FIG. 2, and the second terminal may be the UE 236 shown in FIG. 2. The first terminal and/or the second terminal may be located within the coverage of the base station. Alternatively, the first terminal and/or the second terminal may be located outside the coverage of the base station. Each of the base station, the first terminal, and the second terminal may be configured to be the same as or similar to the communication node 300 shown in FIG. 3. The first terminal and/or the second terminal may support the protocol stacks shown in FIGS. 4 to 6.

The base station may configure one or more resource pools. For example, the base station may configure a type 1 resource pool and a type 2 resource pool. The type 1 resource pool may be a resource pool that allows transmission of high priority sidelink data (e.g., URLLC data, public safety data). The URLLC data may be sidelink data transmitted according to the URLLC requirements, and the public safety data may be sidelink data transmitted according to the public safety requirements. The sidelink data having a high priority may be transmitted without scheduling by an SCI in the type 1 resource pool. For example, the high priority sidelink data may be transmitted using resources allocated for other sidelink data (e.g., low priority sidelink data) in the type 1 resource pool. The sidelink data having a high priority may be transmitted according to a preconfigured transmission pattern (e.g., transmission type) in the type 1 resource pool.

Configuration information of the type 1 resource pool may include one or more information elements among information indicating that sidelink data transmission is allowed without scheduling by an SCI, priority information (e.g., a priority of sidelink data that can be transmitted without scheduling by an SCI), usage information (e.g., the use of sidelink data that can be transmitted without scheduling by an SCI), SCI information (e.g., information of a resource through which SCI including scheduling information of previously transmitted sidelink data is transmitted), and transmission pattern information. For example, the SCI information may include an offset between a time (e.g., transmission start time or transmission end time) of transmitting the last sidelink data and a time (e.g., transmission start time or transmission end time) of transmitting the SCI or an offset between a time (e.g., reception start time or reception end time) of receiving sidelink configuration information including configuration information of the resource pool and a time (transmission start time or transmission end time) of transmitting the SCI. Further, the information of the type 1 resource pool may further include the information element(s) described in Table 3 or Table 4.

The type 2 resource pool may be a resource pool that does not allow transmission of the sidelink data not scheduled by an SCI. Configuration information of the type 2 resource pool may include information indicating that transmission of sidelink data not scheduled by an SCI is not allowed. Further, the information of the type 2 resource pool may further include the information element(s) described in Table 3 or Table 4. The type 2 resource pool may be configured independently of the type 1 resource pool.

The base station may be configured to generate sidelink configuration information including configuration information of a type 1 resource pool and/or configuration information of a type 2 resource pool (S1201). The base station may be configured to inform terminals (e.g., the first terminal and the second terminal) of the sidelink configuration information by using a combination of one or more among a higher layer message, a MAC message, and a PHY layer message (S1202). In addition, the sidelink configuration information may be reconfigured after the step S1202. In particular, sidelink reconfiguration information may be transmitted to the terminals (e.g., the first terminal and the second terminal) by using a combination of one or more among a higher layer message, a MAC message, and a PHY layer message.

The terminals may be configured to receive the sidelink configuration information (or sidelink reconfiguration information) from the base station, and perform sidelink communication based on the received sidelink configuration information (or sidelink reconfiguration information). For example, when a priority of sidelink data to be transmitted by the first terminal matches a priority indicated by the configuration information of the type 1 resource pool, the first terminal may be configured to transmit the sidelink data to the second terminal without scheduling by an SCI (S1203, S1204). Particularly, the sidelink data may be repeatedly transmitted n times. The first terminal may be configured to transmit the sidelink data by using a resource scheduled for transmission of other sidelink data (e.g., sidelink data having a lower priority), a sensed resource, or an arbitrary resource within the type 1 resource pool. The sidelink data may be transmitted according to a transmission pattern indicated by the configuration information of the type 1 resource pool.

After the (re)transmission of the sidelink data is completed (e.g., after the step S1204), the first terminal may generate an SCI including scheduling information of the sidelink data transmitted in the steps S1203 and S1204 (S1205), and may transmit the SCI to the second terminal (S1206). The SCI may include the information element(s) described in Table 5. For example, a priority included in the SCI may indicate the priority of the sidelink data transmitted in the steps S1203 and S1204. The frequency resource allocation included in the SCI may indicate the frequency resource through which the sidelink data has been transmitted in the steps S1203 and S1204. The time resource allocation included in the SCI may indicate the time resource through which the sidelink data has been transmitted in the steps S1203 and S1204.

Meanwhile, when the sidelink configuration information includes the configuration information of the type 1-resource pool or when the second terminal operates in the type 1-resource pool, the second terminal may be configured to perform a monitoring operation in the type 1-resource pool, and store signals obtained by the monitoring operation in a buffer. When the SCI is received from the first terminal, the second terminal may obtain the sidelink data by decoding the signals stored in the buffer based on the information element(s) included in the SCI. The SCI may be received through a resource indicated by sidelink configuration information. When the second terminal fails to obtain the sidelink data from the first terminal, a retransmission procedure for the corresponding sidelink data may be performed.

The exemplary embodiments of the present disclosure may be implemented as program instructions executable by a variety of computers and recorded on non-transitory a computer readable medium. The non-transitory computer readable medium may include a program instruction, a data file, a data structure, or a combination thereof. The program instructions recorded on the non-transitory computer readable medium may be designed and configured specifically for the present disclosure or may be publicly known and available to those who are skilled in the field of computer software.

Examples of the non-transitory computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device may be configured to operate as at least one software module to perform the exemplary embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method of a first user equipment (UE), comprising:
transmitting, to a second UE, first sidelink control information (SCI) including resource allocation information through a physical sidelink control channel (PSCCH); and
transmitting, to the second UE, second SCI including information used for determining whether a sidelink communication in a sidelink resource allocated by the first SCI is stopped or not, through a physical sidelink shared channel (PSSCH) scheduled by the first SCI,
wherein, when it is determined that the sidelink communication is not stopped based on the second SCI, the sidelink communication is performed based on the second SCI associated with the first SCI in the sidelink resource allocated by the first SCI; and
when it is determined that the sidelink communication is stopped based on the second SCI, the sidelink communication of the second UE is not performed in the sidelink resource allocated by the first SCI.

2. The method according to claim 1, wherein the first SCI further includes at least one of information indicating a periodicity of physical resources or a modulation and coding scheme (MCS) information.

3. The method according to claim 1, wherein one or more information elements included in the first SCI are configured based on one or more information elements indicated by a higher layer message.

4. The method according to claim 1, wherein physical resources indicated by the resource allocation information included in the first SCI are determined autonomously by the first UE without scheduling of a base station.

5. The method according to claim 1, further comprising:
receiving, from a base station, downlink control information (DCI),
wherein one or more information elements included in the first SCI are configured based on one or more information elements indicated by the DCI.

6. The method according to claim 1, wherein the first SCI is used to schedule a retransmission operation of sidelink data, and the sidelink data is repeatedly transmitted through physical resources indicated by the first SCI.

7. The method according to claim 1, wherein the second SCI further includes at least one of a hybrid automatic repeat request (HARQ) process number, a new data indicator (NDI), or a redundancy version (RV).

8. A first user equipment (UE), comprising:
a processor,
wherein the processor causes the first UE to:
transmit, to a second UE, first sidelink control information (SCI) including resource allocation information through a physical sidelink control channel (PSCCH); and
transmit, to the second UE, second SCI including information used for determining whether a sidelink communication in a sidelink resource allocated by the first SCI is stopped or not, through a physical sidelink shared channel (PSSCH) scheduled by the first SCI,
wherein, when it is determined that the sidelink communication is not stopped based on the second SCI, the sidelink communication is performed based on the second SCI associated with the first SCI in the sidelink resource allocated by the first SCI; and
when it is determined that the sidelink communication is stopped based on the second SCI, the sidelink communication of the second UE is not performed in the sidelink resource allocated by the first SCI.

9. The first UE according to claim 8, wherein the first SCI further includes at least one of information indicating a periodicity of physical resources or a modulation and coding scheme (MCS) information.

10. The first UE according to claim 8, wherein one or more information elements included in the first SCI are configured based on one or more information elements indicated by a higher layer message.

11. The first UE according to claim 8, wherein physical resources indicated by the resource allocation information included in the first SCI are determined autonomously by the first UE without scheduling of a base station.

12. The first UE according to claim 8, wherein the processor further causes the first UE to:
- receive, from a base station, downlink control information (DCI),
- wherein one or more information elements included in the first SCI are configured based on one or more information elements indicated by the DCI.

13. The first UE according to claim 8, wherein the first SCI is used to schedule a retransmission operation of sidelink data, and the sidelink data is repeatedly transmitted through physical resources indicated by the first SCI.

14. The first UE according to claim 8, wherein the second SCI further includes at least one of a hybrid automatic repeat request (HARQ) process number, a new data indicator (NDI), or a redundancy version (RV).

* * * * *

UNITED STATES PATENT AND TRADEMARK OFFICE
CERTIFICATE OF CORRECTION

| | | |
|---|---|---|
| PATENT NO. | : 12,015,477 B2 | Page 1 of 1 |
| APPLICATION NO. | : 18/076527 | |
| DATED | : June 18, 2024 | |
| INVENTOR(S) | : Gene Back Hahn et al. | |

It is certified that error appears in the above-identified patent and that said Letters Patent is hereby corrected as shown below:

On the Title Page

Item (30) Foreign Application Priority Data to read as:
(30) Foreign Application Priority Data
Jul. 1, 2020 (KR)................................10-2020-0081111

Signed and Sealed this
Tenth Day of September, 2024

Katherine Kelly Vidal
Director of the United States Patent and Trademark Office